(12) United States Patent
Nelson

(10) Patent No.: US 6,497,074 B2
(45) Date of Patent: Dec. 24, 2002

(54) MULTI-LAYER FLEXIBLE PANEL MODULES WITH EXTERIOR AND INTERIOR STRESSED LAYERS SPREAD APART AT THE ENDS AND CONNECTED INTERMEDIATE THE ENDS INDUCING OPPOSING CONCAVE DEFLECTIONS TO THE LAYERS

(75) Inventor: Richard C. Nelson, Pierrefonds (CA)

(73) Assignee: Sunarc Structures Inc., Montreal (CA)

( * ) Notice: Subject to any disclaimer, the term of this patent is extended or adjusted under 35 U.S.C. 154(b) by 0 days.

(21) Appl. No.: 10/003,277

(22) Filed: Dec. 6, 2001

(65) Prior Publication Data

US 2002/0038529 A1 Apr. 4, 2002

Related U.S. Application Data

(63) Continuation of application No. PCT/CA00/00700, filed on Jun. 8, 2000.
(60) Provisional application No. 60/138,548, filed on Jun. 10, 1999.

(51) Int. Cl.[7] .................................................. E04B 1/34
(52) U.S. Cl. ......................... 52/2.23; 52/2.22; 135/90; 135/97
(58) Field of Search ................................ 52/2.22, 2.23, 52/2.24, 13; 135/90, 97, 96, 121, 122, 123, 125, 157

(56) References Cited

U.S. PATENT DOCUMENTS

| 3,294,605 A | 12/1966 | Fischer |
| 4,452,230 A | 6/1984 | Nelson |

FOREIGN PATENT DOCUMENTS

| CA | 1182375 | 2/1985 |
| DE | 298 09 487 | 2/1999 |
| DE | 299 01 970 | 4/1999 |
| FR | 2471738 | 6/1981 |
| GB | 821333 | 10/1959 |
| GB | 1550488 | 8/1979 |
| WO | 89 04896 | 6/1989 |

*Primary Examiner*—Carl D. Friedman
*Assistant Examiner*—Naoko Slack
(74) *Attorney, Agent, or Firm*—Ogilvy Renault; Robert Mitchell

(57) ABSTRACT

A lightweight building construction system comprising multiple similar stressed roof and wall paneling modules (22, 122) assembled together to form a modular building envelope. Each roof module (22, 122) typically includes a double-skin panel (1,4/101) having structurally interacting inner and outer layers (4,3/104,103) joined together at mid-span and stretched in a V-shaped configuration between spaced-apart structural elements (9, 109). A linear gutter (2) can hang from the double-skin panel (22) at the junction of the inner and outer layers (4,3) thereof to drain water, thereby preventing ponding problems. The stressed paneling modules (22) may be supported by lightweight non-rigid tensely arched members (15, 16).

22 Claims, 7 Drawing Sheets

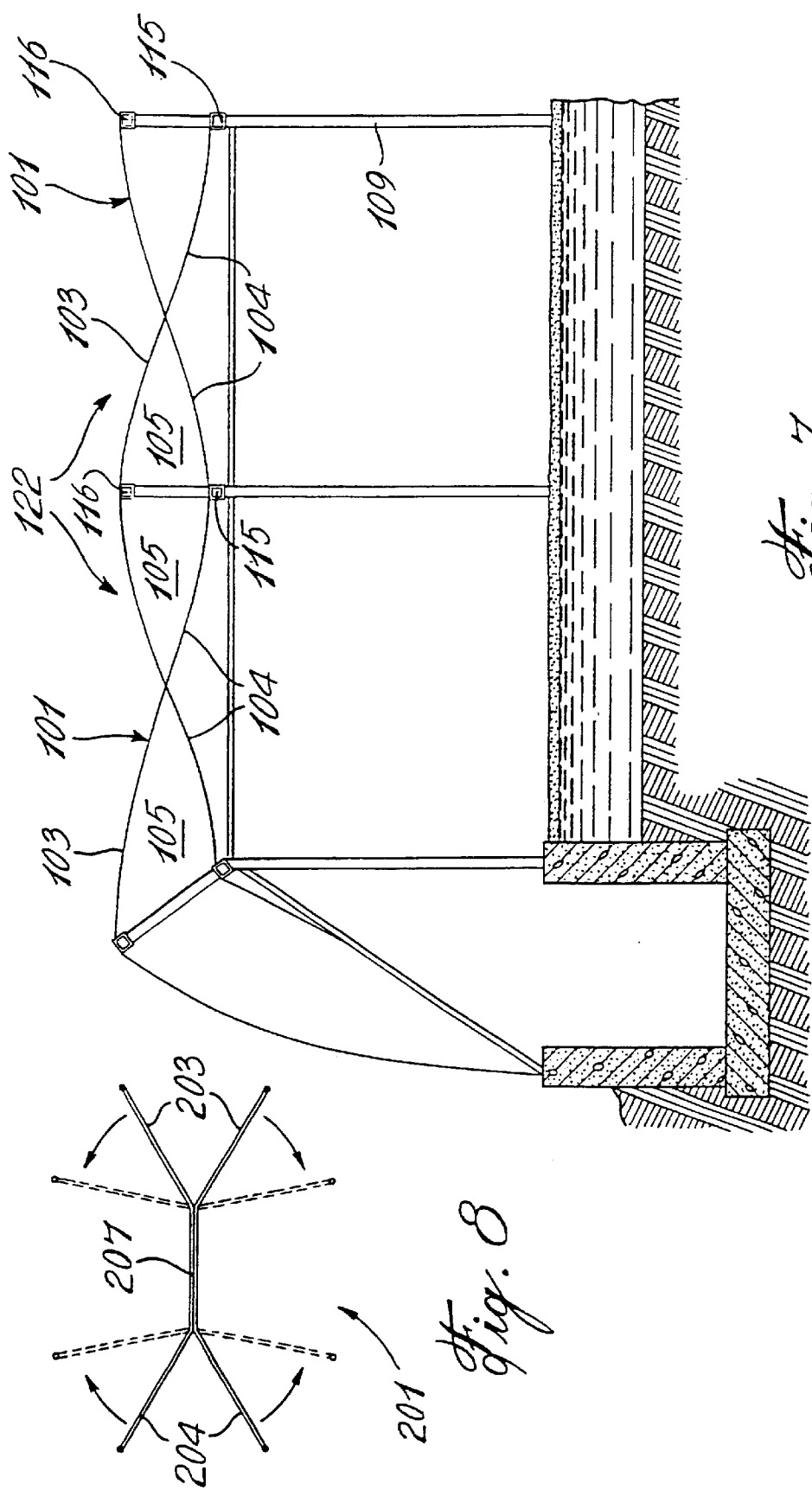

MULTI-LAYER FLEXIBLE PANEL MODULES WITH EXTERIOR AND INTERIOR STRESSED LAYERS SPREAD APART AT THE ENDS AND CONNECTED INTERMEDIATE THE ENDS INDUCING OPPOSING CONCAVE DEFLECTIONS TO THE LAYERS

RELATED APPLICATIONS

This is a continuation of International PCT Application No. PCT/CA00/00700 filed on Jun. 8, 2000 which claims the benefit of U.S. Application No. 60/138,548 filing date Jun. 10, 1999.

BACKGROUND OF THE INVENTION

1. Field of the Invention

The present invention relates to building structures and, more particularly, to structural techniques utilizing lightweight materials to perform a load bearing function.

2. Description of the Prior Art

Let us first consider the fundamental difference between systems of rigid versus non-rigid building construction systems. Historically, buildings evolved from compression structures built from materials such as stone and clay bricks that are completely rigid. For these materials to fail under load, requires extreme compressive force that will cause the structural members to be crushed or to fracture. The problem with such constructions is the excessive weight of the materials.

Advancements in materials and construction technology created new components and structural members designed to work in both compression and tension. These structural components and members are designed with sufficient stiffness to prevent a member from buckling under compression loads. Wood is among the early materials having both good compression and tensile strength. Modern materials technology has focused on the use of metal structural members that have equal or greater tensile strength than compressive strength. These structural members can be used to fabricate engineered structural components such as Open Web Joists that can be used to construct rigid, free span structures using a minimum weight of material. For a given weight a non-rigid metal member or cable acting purely in tension can carry a greater load over a given span than any of the above mentioned structural members.

Conventional metal structures are designed with strict tolerance in regard to the stiffness of members in bending, because deflection of a member under compressive load will cause the member to buckle resulting in immediate structural failure. Engineered components such as open web joists are very light in weight, and work equally well in compression or tension, but perform poorly in deflection. When joists are used in the construction of conventional flat roofs the combined live and dead loads must be specified with careful reference to building codes so that the joists will be sufficiently rigid to prevent ponding. State-of-the-art design of flat roofs strictly limits deflection and gives careful consideration to the drainage of water off the roof, especially in the case where the formation of ice or collection of debris may cause drainage problems. Neglect in these matters can ultimately result in ponding on the roof and lead to structural failure.

More recently flexible architectural fabrics have been used as the cladding or "stressed skin" of the building envelope. These thin cladding materials act purely in tension. Stressed skin methods of construction differ from traditional tent-like structures in that tension forces are introduced into the sheet material after it has been installed. Referred to as "post-tension", it is this force that is used to stabilize the thin cladding or skin. In traditional tents a skin is fitted to the frame but not stressed and therefore it is free to deflect in it's span between structural supports. Such traditional tents show noticeable movement and fluttering of the skin in the wind. Attempts to simply stretch the material tight are limited in their effectiveness, since a relatively weak force acting at a right angle to the skin will be able to significantly deflect the skin at the center span. Therefore, the modem approach is to use air pressure or structural tension members like cables to introduce a controlled amount of deflection and post-tension in the skin to create thereby a stressed skin structure.

High strength architectural fabrics have used air pressure and cable system post-tension methods in the construction of very large stressed skin roof systems such as Olympic Stadiums and airport terminal buildings. These large membrane roof systems have complex double curvature surface areas comprised of many individual membrane panels having irregular curved "sail shapes" which are joined together to form the shape of roof. In the opposite extreme, weak film materials have been used to construct large area greenhouse structures where, for example, polyethylene film is used as a stressed skin over arched frames to cover agricultural crops. The film material is placed over the arches and cables or cords are placed over the top of the film between the frames to draw down and tension the film. Alternatively, a double layer of polyethylene film is attached over the arched frames and then air pressure is used to create an air pillow type of stressed skin.

It is evident that the gradual evolution of building design toward lightweight, flat roof, construction is driven by the efficiency of such systems. In general these systems cost less to build. The problem is that state-of-the-art building design for flat and low-profile roofs do not make use of the full potential of flexible sheet material and non-rigid structural members, that work most efficiently in tension, because of the ponding problem mentioned above.

Another problem of the prior art systems resides in the fact that many of the sheet materials show elastic elongation under load which can exaggerate the deflection that may be anticipated. This is an especially serious problem in the case of the solar sheet materials like transparent films and translucent membranes, which can be more elastic. Many excellent solar sheet materials with good tensile strength exhibit significant elasticity under load, which, especially for economical flat roof construction, necessitates the specific methods provided herein in order to avoid the serious problem of ponding.

Previous stressed roof panels, such as those described in my U.S. Pat. No. 4,452,230 issued on Jun. 5, 1984, are typically built with significant slope across the panels span, as this is known to be a requirement to prevent the collapse or inversion of the flexible sheet material or panels due to live loads. These previous types of structures, even though built with strong architectural fabric would, if built with insufficient slope, suffer from ponding due to high live loads caused by snow and rain. Deflection of the stressed skin or panel would cause the pooling and the collecting of water, snow or ice, generally referred to as "ponding" that then produces even greater loads in the area of inverted skin. Such ponding and inversion of the fabric stressed skin roof systems can then lead to roof collapse and structural failure. Therefore, these previous roof construction systems are not suited to flat, low profile roof systems, which are the most economical to build.

SUMMARY OF THE INVENTION

It is therefore an aim of the present invention to provide improved lightweight structures covered with flexible sheet materials.

It is also an aim of the present invention to provide an improved roof drainage system that prevents ponding on lightweight roofs covered with thin flexible sheet materials.

It is also an aim of the present invention to provide a new modular stressed-panel building envelope comprising a plurality of double-layer flexible panels.

The present invention also discloses improvements whereby the tensile strength of the building envelope materials are fully exploited while the structural members and/or the sheet materials are permitted to deflect in a predetermined manner when under load.

Therefore, in accordance with the present invention, there is provided a modular stressed-panel building envelope, comprising a plurality of multi-layer flexible paneling modules adapted to be stretched between structural members, each of said multi-layer paneling modules having at least exterior and interior stressed layers defining a free space therebetween, said exterior and interior layers being operatively connected to work structurally in opposition to each other.

In accordance with a further general aspect of the present invention, there is provided a lightweight building construction system, comprising multiple similar stressed roof and wall paneling modules assembled together to form a modular building envelope, wherein each roof paneling module includes at least interior and exterior flexible layers stretched between spaced-apart structural elements, said interior and exterior flexible layers being joined together between said structural element to work in tandem once in a stressed state.

In accordance with a further general aspect of the present invention, there is provided a canopy system for a building structure, comprising panel means stretched in a V-shaped configuration between spaced-apart structural elements so as to define a trough therebetween, and gutter means hanging from said panel means at said trough for draining off water from said panel means, while allowing said gutter means to move jointly with said panel means.

In accordance with a further general aspect of the present invention, there is provided a flexible joist for a lightweight building structure, comprising a first elongated flexible member adapted to be supported in tension in an elevated position, a second elongated flexible member adapted to be supported in tension beneath said first elongated flexible member, and tensor means extending between said first and second elongated flexible members to induce opposing concave deflections in said first and second elongated flexible members, while preventing said first and second elongated flexible members from returning to respective relaxed positions thereof.

According to one application of the present invention, the construction methods disclosed in the present specification improve the performance and economy of a roof construction by means of an improved roof drainage system that prevents ponding on lightweight roofs covered with thin flexible sheet materials. These methods also optimize the structural performance of flexible sheet materials and metal structural components by taking advantage of their typical high tensile strength. In this specification, these improved methods are referred to generally as a "stressed-panel" system of construction. This term also refers to the specifications provided herein for the modularization of the roof and wall systems so that the sheet material is pre-manufactured as modular panels that increase the economy and speed of manufacturing and construction.

In one preferred embodiment of the present invention, transparent or translucent sheet materials are used in the construction of a type of lightweight structure referred to as a "Solar Structure". The Solar Structure may be constructed with double or triple layers of transparent or translucent sheet material forming a building envelope wherein there are duct like cavity spaces formed between the sheet materials. Thin sheet materials having high optical clarity provide the best solar energy transmission for multiple layer construction. Often, good optical performance of the materials can conflict with obtaining the best structural strength and dimensional stability, and in such cases, the methods and devices disclosed herein have particular advantages. In general the optically transparent sheet materials or panels utilized in this construction may be referred to as films, while higher tensile strength, translucent, scrim or fabric reinforced sheet materials are referred to as membranes or architectural fabrics, respectively.

BRIEF DESCRIPTION OF THE DRAWINGS

Having thus generally described the nature of the invention, reference will now be made to the accompanying drawings, showing by way of illustration a preferred embodiment thereof, and in which:

FIG. 7 is a cross-sectional view of a lightweight building structure in accordance with a fourth embodiment of the present invention; and FIG. 8 is a cross-sectional view of another type of stressed panel, illustrating how the panel is stretched in a deployed functional position thereof.

DESCRIPTION OF THE PREFERRED EMBODIMENTS

Figure 1:
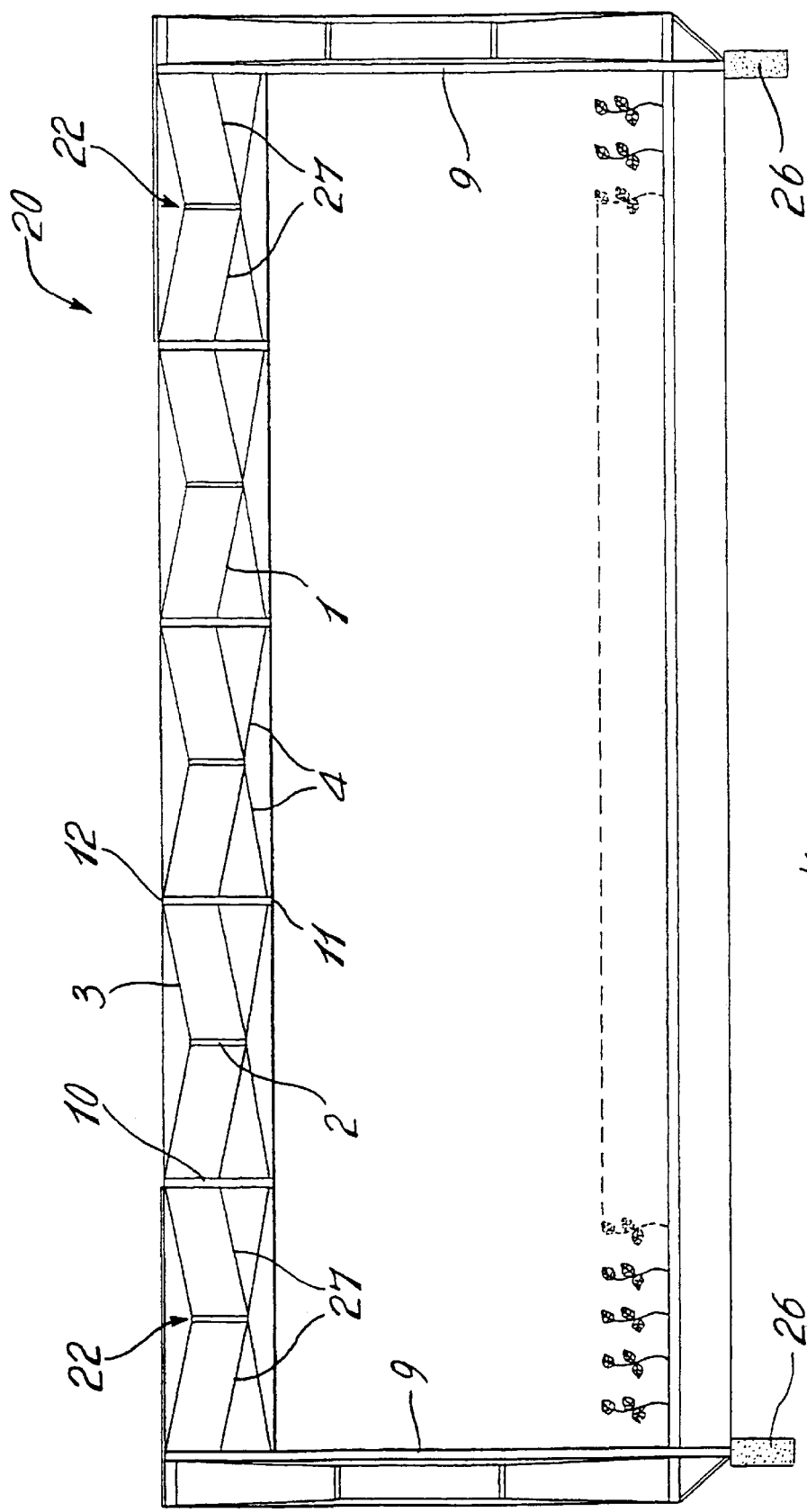
FIG. 1 is a cross-sectional view of a lightweight building structure in accordance with a first embodiment of the present invention.

FIGS. 1 to 6 refer to preferred embodiments of the present invention called "Solar Structure", which is defined herein as a building envelope which is transparent or semi-transparent. Examples of such Solar Structures are greenhouses, solaria and sun-spaces, and atria or courtyard spaces within building complexes. Natural light is preferable for controlled environment agriculture, recreation and sport complexes and the use of a transparent A Solar Structure can provide considerable savings on the use of high intensity artificial lighting. In some cases the visual clarity, or view, through the building envelope is important and high optical clarity thin film is generally utilized in these applications.

Solar Structures will typically utilize a high light transmission exterior membrane, to carry the live load of snow and heavy rainfall, an optically clear middle film layer, and an interior membrane that will absorb wind up lift force and that will work structurally in tandem with the exterior membrane. This construction for a prefabricated stressed-panel roof envelope will provide the highest possible natural light in buildings and the maximum utilization of solar energy.

Both the walls and roof of the building are assembled from many modular, prefabricated stressed-panels. Each stressed-panel may be prefabricated in a manner that provides air cavity spaces to be formed between the solar sheet material. When attached to the structure the multiple layers of the stressed-panels form duct-like cavity spaces that are used to channel the flow of air, air/liquid and air/vapor mixtures and working fluids throughout the building envelope.

A first Solar Structure embodiment will now be described in detail with reference to FIG. 1. A cross-section of a Solar Structure (20) is illustrated, comprising multiple identical stressed paneling modules (22) which are assembled together to form a modular building envelope. More particularly, each stressed paneling module (22) is supported between a pair of spaced-apart joists (10) which are, in turn, supported by columns (9) having a foundation (26). Each stressed paneling module (22) may be formed of a pair of side by side connected tubular roof-panels (1), each of which has a top exterior membrane (3) and an intermediate membrane (27). Each stressed paneling module (22) further includes a bottom interior membrane (4) which connected at mid-span to the top exterior membrane (3) to structurally interact therewith.

Figure 2:
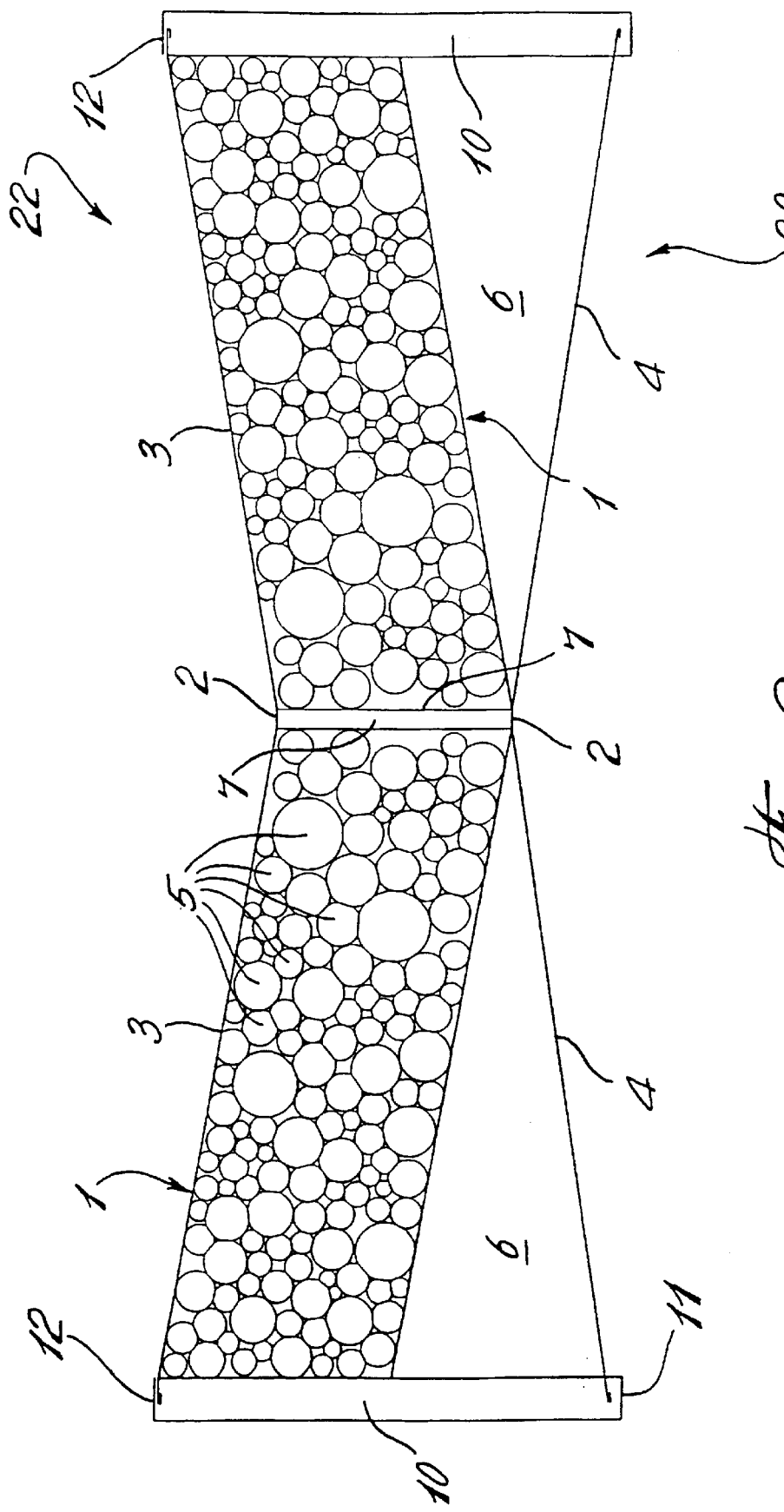
FIG. 2 is an enlarged cross-sectional view of a stressed-panel module of the lightweight structure of the embodiment of FIG. 1, illustrating roof cavity spaces of a substantially rectangular cross sectional shape.
Figure 3:
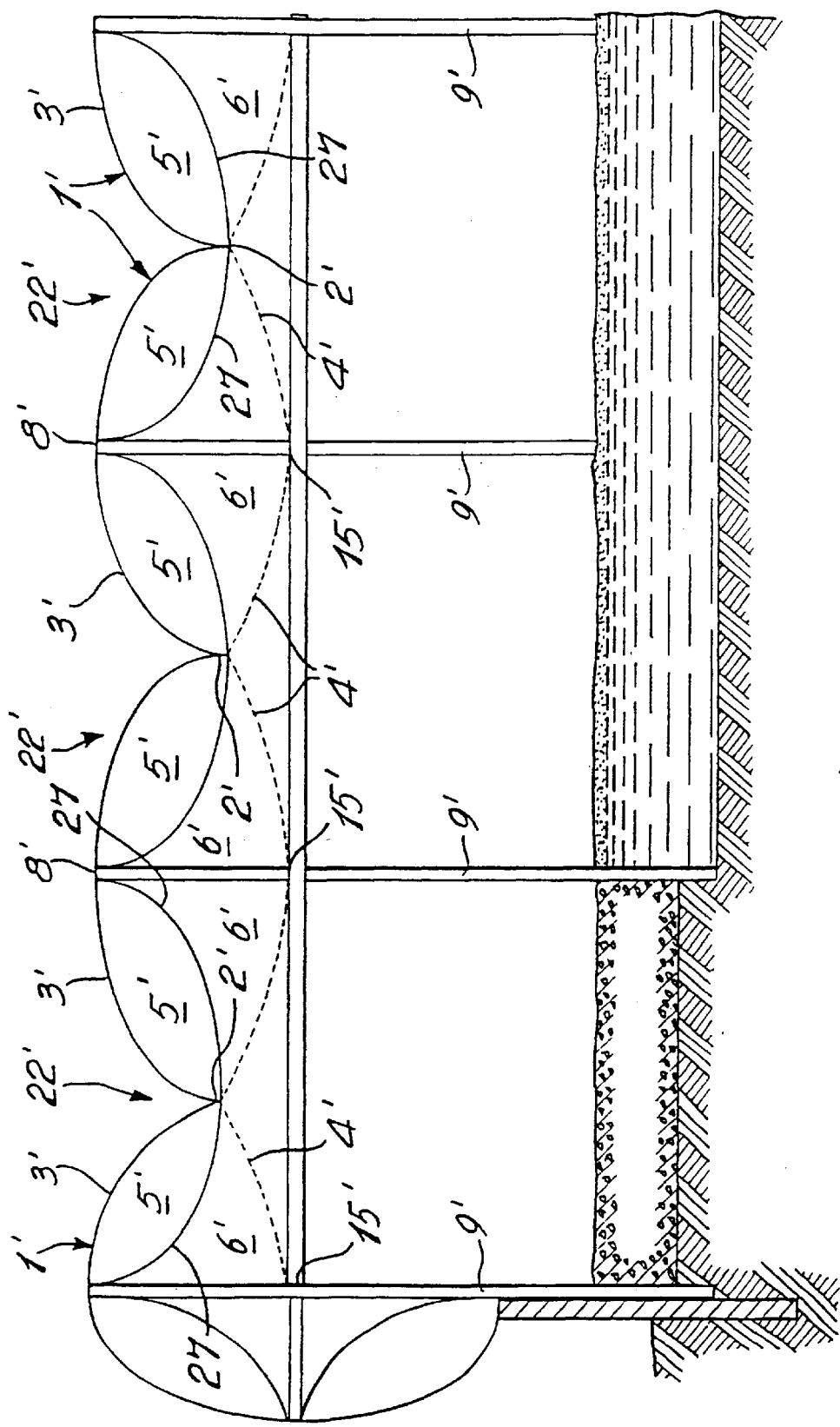
FIG. 3 is a cross-sectional view of a lightweight building structure, wherein the exterior roof cavity spaces have lens-shaped cross-sections in accordance with a second embodiment of the present invention.

FIGS. 1 to 3, which are cross-sections taken in the plane of the panel or membrane span, illustrate that, typically all the structural members, such as the open web joists (10) or the bow-members (15) and (16) (see FIG. 5), are placed at the same elevation. Additionally, structural members are nearly horizontal in their span. The exterior membranes (3) must therefore cross the spans in a substantially horizontal plane that has a minimal slope. Therefore, under live load conditions, the exterior membranes (3) may be expected to deflect. In a fundamental improvement to the concept of stressed skin structures, the present invention discloses a modular stressed-panel construction where a continuous, linear gutter (2) is formed by the assembly of adjoining stressed-panels (1) along the middle of the span. The live loads that are carried on the exterior membranes (3) and in the gutter (2) are supported solely by the tensile strength of the exterior membranes (3) of the two adjoining stressed panels (1) of each paneling module (22).

More specifically, the gutter system is formed between the symmetrical adjoining roof-panels (1) of each paneling module (22). Each gutter (2) joins the roof-panels (1) of the associated paneling module (22) together. Each roof-panel (1) may be a prefabricated modular unit from a joist to the gutter (2) attachment. Alternatively, each stressed paneling module (22) may be comprised of a pair of roof-panels (1) that are prefabricated to form a continuous exterior membrane (3) over the top cord (12) member of Joist (10) from one gutter (2) to the next gutter (2). Different modular assembly and pre-fabrication details are possible within the scope of this invention.

FIG. 2 shows a detailed cross-section of one Bow-tie type stressed-paneling module (22). The key concept is that the gutter (2) both connects together adjoining Bow-tie roof-panels (1) and provides a continuous connection to the bottom interior membrane (4) beneath. It is this connection, at the mid-span of the roof cover, that creates post-tension in the exterior membrane formed by the adjoining roof-panels (1) and the bottom interior membranes (4), so that the exterior and interior membranes (3) and (4) act in opposition to each other. The bottom interior membrane (4) pulls downward at the center span of the adjoining roof-panels (1) thereby resisting wind up lift forces using only its tensile strength. Conversely the downward force of live loads on the bow-tie type roof-panels (1) is supported only by tensile strength of the exterior membranes (3). The gutter (2) is supported only by the film or membrane stressed-panel system and has no direct support from the structural frame.

Structural post-tension is created between the exterior membranes (3) and the bottom interior membrane (4) by means of closure mechanisms and methods used to assemble the gutter (2). As the exterior membranes (3) are drawn together at the gutter (2), using ties or mechanical fasteners, a triangle of force is established through the gutter (2) side walls (7) to the bottom interior membrane (4) below. While the assembly methods at the gutter (2) may be utilized to provide post-tension, an alternate approach is to create tension by the assembly of the bottom interior membrane (4) to the bottom chords (11) of the joists (10).

Using the structural post-tension approach, the Bow-tie roof cover can carry considerable live loads including snow and rainwater. The Bow-tie roof-panel depth determines the gutter depth. It is apparent that even under maximum loading, the roof cavity depth remains constant and therefore this type of roof-panel (1) is recommended for the highest quality of climate control in more extreme climates.

Individual roof cavity (5) spaces are formed by each of the modular roof-panels (1). Similarly, an individual chiller cavity (6) is formed beneath each set of roof-panels (1) and the bottom interior membrane (4) below. The gutter (2) is free to move with the elastic strain in the membrane layers of the stressed-panel. No structural members are used to support or constrain the movement of the gutter (2). Also drainage connections, if any, to the gutter (2) are made with flexible hose, so that there is no constraint upon the movement of the gutter (2). These methods assure that whatever the live load conditions, even if they cause deflection or elastic deformation of the stressed-panel system, there will never be ponding within the roof system.

Figure 4:
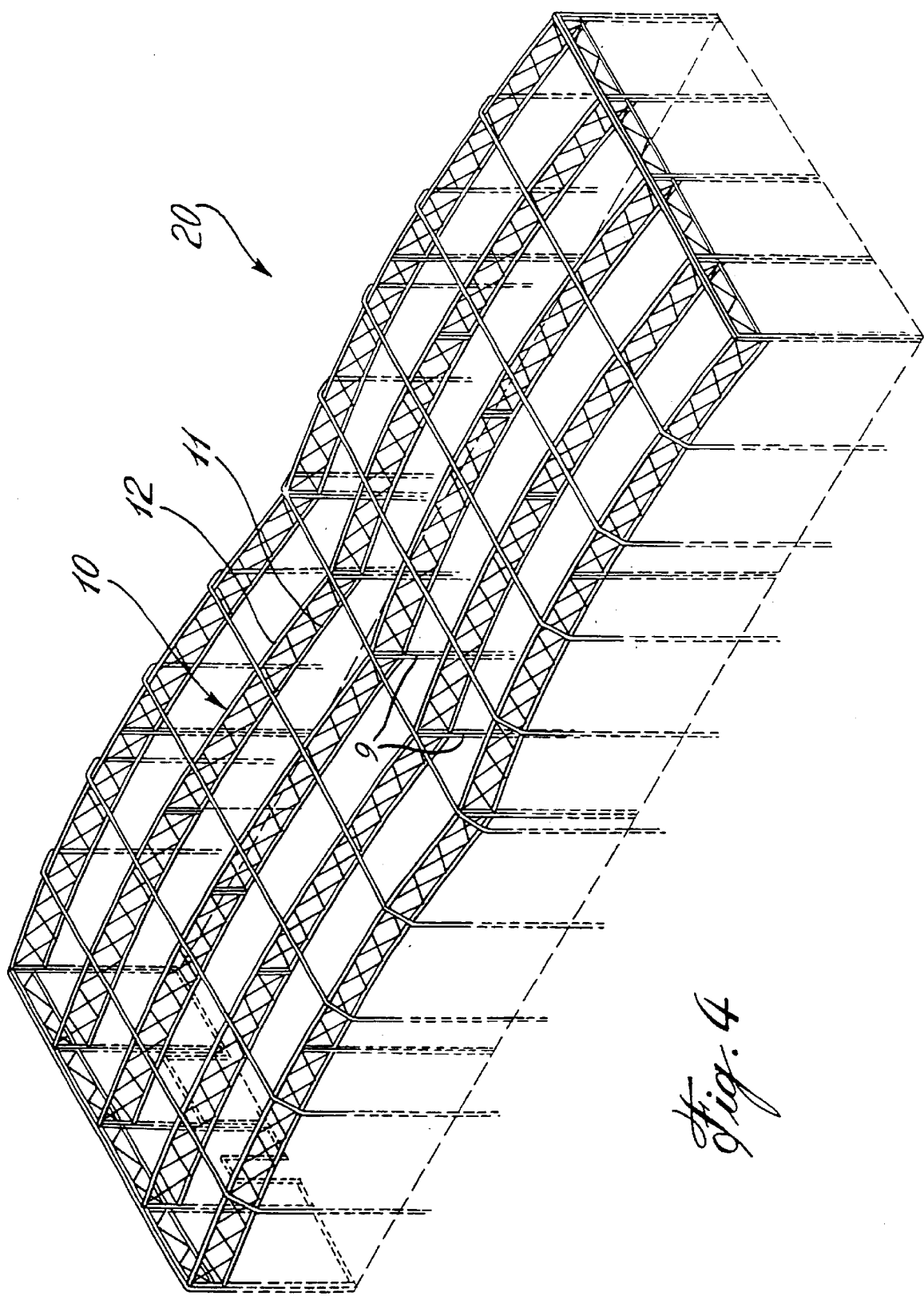
FIG. 4 is a perspective view of a low profile arched roof solar structure in accordance with a third embodiment of the present invention.
Figure 5:
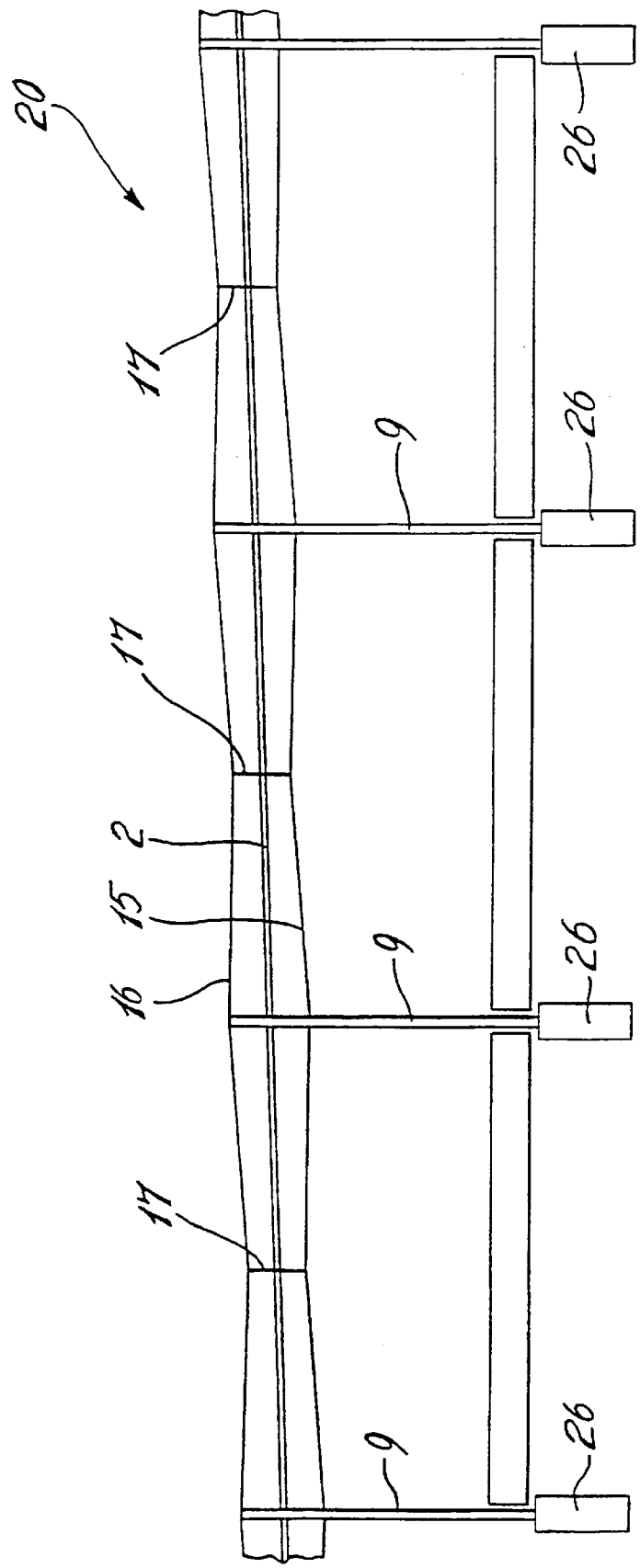
FIG. 5 is a transverse longitudinal cross-sectional view of the lightweight building structure of FIG. 1.

As shown in FIGS. 1, 2 and 4, the open web joists 10 or other conventional structural roof components that provide a rigid span construction are suitable for the purpose of supporting the stressed-panel building envelope. However, in an improvement over such known lightweight roof member design, a new type of roof component is herein disclosed that can optimize the performance of the stressed-panel system. This type of structure will be referred to herein as a "Bow-structure". A Bow-structure is shown in FIGS. 3 and 5. More particularly, FIG. 5 shows a cross-section of the building bay, which is a sectional view transverse to the "Lens" roof-panel (1) cross-section shown in FIG. 3.

The bow-structure is an important embodiment of the invention that offers significant cost savings and engineering advantages over the state-of-the-art arched frames and tunnel type structures that are typically used to carry plastic film crop covers. The Bow-structure makes good use of the tensile strength of plastic films and membranes. These light and thin, transparent or translucent, sheet materials are typically used in a short unsupported free span from 10 to 20 feet. The life of the plastic material is extended because it does not directly rest on metal supports which, when exposed to sunlight become quite hot and cause accelerated weathering of the plastic cover.

As shown in FIG. 5, the structural members supporting the stressed-panel roof system need not be rigid in their design. In fact the bow-members (15,16) behave very much like cables which are designed to take loads only in tension. There are two of these non-rigid structural bow-members, referred to as the interior bow-member (15) and exterior bow-member (16). The exterior bow-member (16) spans, across the building bay, from the top of one column (9) to the next in order to provide support for the stressed panels 1. This exterior bow-member (16) deflects downward in a very shallow concave arc or "bow" shape while the interior bow-member (15), which is attached to the column (9) at a distance of 3 to 6 feet below, will bow upward in a shallow concave arc. The interior bow-member (15) is adapted to be attached to the bottom interior membrane 4. The tensile force in the stressed-panel causes this symmetric deflection of the bow-members (15, 16) as they traverse the span from column to column. This span, typically 40 feet, determines the width of the building bays of the structure.

The manner in which the interior bow-member (15) is attached to the column (9) permits to the interior bow-member (15) to deflect and become more concave due to up-lift wind forces. Bowstring (17) attachment are provided at each center span to ensure that the interior bow-member (15) can not invert and become convex, which would lead to ponding of water within the bottom interior membrane (4). The column connection is made with slotted holes in the column (9) to let in the head of a bolt so that it may pivot to become aligned with the direction of the tension forces created in the interior bow-member (15). The tightening of these bolt connections between the interior bow-member (15) and the column (9) straighten the interior bow-member (15).

This connection method may also pull the interior bow-member (15) downward so as to introduce structural post-tension into the stressed-panel module. Stressed-panels, if fabricated from membranes rather than films, may be stressed in this manner because the membrane construction is less elastic. Such stressed-panel systems using membranes or architecture fabrics, which are dimensionally stable under load, are particularly suited to the bow-tie roof-panel design using structural post-tension mechanisms. This membrane type of roof-panel (1), which is built with a side wall depth, does not require air pressure to create the roof cavity (5) spaces. The cross-sectional shape of the roof cavity (5) of this bow-tie type of the roof-panel (1) is approximately rectangular as shown in the roof-panel (1) cross-sectional views of FIGS. 1 and 2.

Up-lift forces on the exterior membranes (3) cause them to arc outwardly due to the elastic strain produced in response to the stress introduced by the wind forces. The vector of force transmitted to the exterior bow member (16) remains in a downward direction, toward the gutter connection. This transfers an up-lift force to the gutter (2) which, is held down by the bottom interior membrane (4) that transfers the up-lift force in tension to the interior bow-member (15). The interior bow-member (15) and column connection resists the up-lift force. Elasticity of the bottom interior membrane (4) may permit some upward movement of the gutter (2), which movement will relax the downward vector of forces in the exterior bow-member (16). For this reason each bowstring (17) is used to place non-elastic connection between the exterior bow-member (16) and the interior bow-member (15). This prevents the exterior bow-member (16) from ever inverting when wind up lift force is exerted on the roof-panels (1). The bowstrings (17) suppress transient structural movement induced by wind gusts that would cause fatigue of materials and mechanical connections. A combination of structural post-tension and pressurization post-tension mechanisms may be used to increase the stability and enhance the resistance of the structure to live load conditions.

It is apparent in FIG. 5 that the deflection of the bow-members 15 and 16 is very slight, and is predetermined by the stress/strain parameters of the members and the post-tension in the stressed-panel system. At the perimeter column it is important to rigidly absorb the unbalanced tensile force that is transmitted to the top of the column (9). The columns (9) must be designed to be rigid to avoid bending against the anticipated maximum live load. A lattice column may be created or a tension member or cable may bring the force to a ground anchor.

Each bowstring (17) may consist of a structural (metal) member taking forces in tension and therefore may be a non-rigid member, for example: a flat bar, a threaded bar or a cable. A film or membrane panel may span vertically between the bow-members (15,16) so as to divide the chiller-cavity (6) along its linear axis.

Each Lens (cross-sectional) shaped roof-panel (1') is created by using positive air pressure within the airtight tubular roof-panel (1'). For further clarity please refer to FIG. 3 which shows a cross-section of a typical modular stressed-panel envelope comprising multiple Lens roof-panels (1'), where each Lens roof-panel (1') is held in tension by a bottom interior membrane (4'). The Lens roof-panel (1') may, for example, be formed using a polyethylene lay-flat tubing of 288 inches width. Along the centerline, the material is secured with a snap-lock extrusion that holds the lay-flat, tubular material on the exterior of a bow-member (16'), which creates a panel module comprising a set of lay-flat tubing, one tube of 144 inches width on each side of this centerline. Along the outside edges of each lay-flat tubular polyethylene Lens roof-panel (1) is a snap-on edge-lock (8').

Some film type roof-panel (1') exhibit significant elastic elongation. With these materials it is best to use the Lens type roof-panel (1') system that can achieve post-tension air pressurization. Some membrane type stressed-panels, depending upon the orientation of the load and the type and strength of the yarn used in the fabric, will exhibit insignificant elongation even when exposed to maximum design load. It is best use these materials for the fabrication of the bow-tie type of roof-panel (1) that may use structural post-tension mechanisms. Film materials require a post-tension mechanism with more potential for dynamic movement and would be typically possible with structural methods. Air pressurization can accommodate the additional deflection that can be expected due to the elasticity of these materials.

The bow-members (15,16 and 15',16') are deflected by structural post-tension in the bow-tie embodiment or alternatively, by the uniform membrane stress that it is introduced by the pressurization of the Lens roof-panel (1') pressurization of the Lens roof-panel (1') will produce up-lift on the bottom interior membranes (4') and interior bow-member (15'). Such inflation pressure in the Lens roof-panel system causes the exterior bow-member (16') to deflect downward with a very shallow arc and the interior bow-member (15') reflect a similar but opposite arc. Air pressurization is the only practical method to introduce the post-tension forces into the Lens System and create a stressed-panel building envelope. This air pressure mechanism is particularly suited to the weaker tensile strength of non-reinforced film and is the best way to avoid problems associated with the propensity of film to elongate in response to structural tension mechanisms.

As shown in FIG. 3, water drainage is provided through gutters (2'). Drain down water flows through gutters (2') onto the panel (4') beneath. Melt water and rainwater does not travel far, typically 10 feet or less, over the outside roof cover to reach the mid-span and then immediately, the water passes through the gutters (2'). Neither is the water held within the gutters (2'), but rather it simply passes through to the bottom interior membrane (4') below. The rapid drainage of water through the stressed-panel roof system eliminates any potential for ponding, which is the accumulation of a live load, such as heavy rainfall on the roof. Ponding is a serious condition that adversely deflects the air pressurized roof cover in a manner, which results in the collapse of the Lens shaped roof cavity. Even so ponding on the roof cover is prevented because of the placement of the gutter (2') structure at mid-span.

Each gutter (2') is held, by membrane post-tension, equidistant from the associated bow-members (15,16) and follows a straight line. A general roof slope from column (9') to column (9') provides the gutter (2') with sufficient slope to insure the proper drainage of soap liquid from roof-cavity spaces (5') within the Bow-tie or Lens roof-panel system. Generally, the distance between the soap liquid drain connections will depend on the roof-panels (1') length. Soap liquid will be drained at each end of the Lens roof-panel (1). The Lens roof-panel (1') may have a length of 200 to 400 feet and may therefore span across a few bays. On the other hand the rainwater and cooling water generally drain from the chiller cavity (6') at the column (9') rows and thus the distance between these drainage outlets is the same as the building bay width.

We have described above the exterior gutter system which is formed at the mid-span of stressed-panel system and have explained how snow melt water and/or rain water flows through the gutters (2, 2') and onto the bottom interior membranes (4, 4'). Each bottom interior membrane (4, 4') extends from the associated gutter (2, 2') to the associated interior bow-member (15, 15'). Cooling water may also be sprayed (distributed by nozzles located within the chiller cavity space) onto the bottom interior membranes (4, 4') and must drain therefrom in just the same way as the roof runoff. For each paneling module, both the rainwater and the cooling water flow to the bottom of the interior membrane slope where the bottom interior membrane (4, 4') attaches to the interior bow-member (15, 15'). The interior bow-member (15, 15') is generally formed as an extrusion with a profile designed for the secure attachment of a pair of bottom interior membrane (4, 4'), one at each side of the bow-member (15, 15').

The interior bow-member (15, 15') may be an open or closed hollow section. As a hollow section, the interior bow-member (15, 15') may receive the drainage water and channel water within the interior bow-member (15, 15') toward the column (9, 9'). An extrusion having a C-section profile where the throat in the open profile faces up will let the drainage water into the section through the throat. Alternatively, the drainage water passes through perforations along the top of a closed hollow section interior bow-member (15, 15'), which will then channels the drainage water to the column (9, 9'). Yet another variation would provide that the drainage water could pass through the interior bow-member (15, 15') and into a drainage trough which is fitted to the underside of the interior bow-member (15, 15').

In another embodiment, the bottom interior membrane may have a porous edging or perforations along the edge thereof where it attaches to the interior bow-member. This drainage mechanism will let the water fall from the bottom interior membrane into the drainage trough, which is supported from beneath, or by fastening along each side of the interior bow-member. In any case, the interior bow-member is utilized to provide structural support for or to be the drainage trough that brings the cooling water and/or rain water to the column rows where a collector pipe catches the water coming down from each stressed paneling module and brings the water to a cistern or to the thermal mass reservoir.

The bow-members span can carry significant live load consisting of the snow/melt water and rainfall, as well as the cooling water and additionally can support various dead loads, as for example: hanging potted plants, lighting, piping etc. Additional bowstring (17) members may be placed at regular intervals across the bow-members span. This will provide support and will transfer loads through to the exterior bow-member (16, 16') that can be designed to carry any specific dead load that may need to be suspended from the lightweight structure system.

The construction methods described herein are especially advantageous for large area roof systems where it is not possible to shed snow loads to the ground. On such large area roofs, of basically horizontal line, the load developed on the roof by torrential rainfall can also be quite significant. The new innovative method of construction described above can carry substantial live loads on a basically horizontal building envelope fabricated from the flexible solar sheet materials, even though these materials will deflect and perhaps elongate significantly because of such live loads. In spite of the expected deflection and/or the elastic elongation this new construction method can drain the snowmelt water or rainfall down through the roof system in a manner that overcomes the ponding problem even in the worst case situation.

Whenever a lightweight structure covered with Lens roof-panels (1') made from film is used in regions with significant snow fall, a snow melting process must be utilized to melt snow as it falls on the roof system so that there is a limited accumulation of snow on the light film roof cover. The melt water is then drained through the gutter system, as is rainfall. Backup systems and emergency power must be provided to ensure that the snow melting process will be reliable and available at any time that it might be needed. As a further fail-safe, should a heavy snow load accumulate over the Lens roof-panels (1'), the Lens shape will give way so that the tubular sheets come together and snow melting will proceed more rapidly. Of course, in those localities where snow accumulation will never occur, such as the tropics, sub tropics and arid deserts such features need not be incorporated into the design.

On the other hand a lightweight structure covered with the bow-tie roof-panels (1) made from membranes or architectural fabrics can be engineered to support full snow loads and maximum snow accumulation that may be anticipated or specified by code. The bow-structure will be engineered to absorb unbalanced loads that are generated at the outside columns (9). The outside columns (9) may be built as lattice columns and additionally the interior columns may have column brace members that connect to each side the column and reach outward at a bracing angle to connect to the exterior bow-member (16), as shown in FIG. 5.

The construction of the transparent solar structure 20 embodiment of this invention will employ solar sheet materials, which include films and membranes. Film types may include any compositions of films, such as: films laminated or co-extruded with fabric scrims and nets; co-extruded films, oriented films whether woven or laminated, fiber reinforced films; and coatings applied to the foregoing films or composite films. Membrane types are typically coated fabrics woven from multi-filament yarns composed of high tensile strength fibers. The yarns selected for these fabrics include glass, polyester, or nylon that are typically used for architectural fabrics. However, unlike typical architectural fabrics, the solar membranes must have high transparency and therefore use optically clear coatings and are typically lighter and thinner with the yarn and the weave of the fabric chosen to maximize solar energy transmission through the coated fabric.

According to other lightweight building constructions, various sheet material may be utilized including, but not limited to: flexible sheet material formed from carbon or silicone based polymers; the same polymer types reinforced with fabrics or fibers; tempered glass sheets and laminated or wire reinforced glass sheet material; and, wire mesh and sheet metal materials.

The term "film" is herein intended to denote a window clear solar sheet material that can function as an alternative to glass, because of its optical transparency. The term "membrane" generally refers to solar sheet material that is reinforced using oriented woven film, scrim, fabrics or other reinforcing means to provide thereby an improved tensile strength and greater dimensional stability that is required to construct the bow-tie embodiment of a stressed-panel building envelope. Therefore, optical clarity is sometimes given up in exchange for the improved strength provided by polymer orientation or a sub-stratum of reinforcing fabric found in such solar sheet material. The reinforcement will reduce slightly the light transmission through the solar sheet material but may greatly reduce visual clarity so that such material would not function well as a view window. A scrim sub-stratum is an open weave that will only slightly reduce the clarity of the view because of the reinforcement of the sheet material.

A further advantage of this invention is to provide a highly cost-effective method of pre-fabricating the stressed-panel for transparent for very large solar structures, examples of which include greenhouse structures and sport arena or stadiums. Such large roof areas are to be efficiently assembled using the large number of identical modular stressed-panels. Such applications require a transparent roof construction for high natural light inside relatively large area structures.

Generally, the following characteristics are common to the embodiments of FIGS. 1 to 5:

1. The membranes (3, 3') form the exterior layer of each pair of adjoining roof-panels (1, 1') that, at the mid-span, assemble or connect continuously to form between them the gutter (2, 2');

2. The roof-panels (1, 1') may have different cross-sectional shapes, such as bow-tie or lens, and thereby form gutters (2, 2') having various depth and types of drainage mechanisms;

3. The gutter (2, 2') formed between a pair of adjoining roof-panels (1, 1') is supported structurally only by the exterior membrane (3, 3') of the paneling module (22, 22'), and is held down by post tension forces exerted by a bottom interior membrane (4, 4') which is assembled or attached continuously to the bottom of the gutter (2, 2').

4. The bottom interior membranes (4, 4') span between the interior bow-member (15, 15') or bottom chord (11) of the joists (10) to the bottom of the gutter (2, 2') and form an interior duct like cavity space below the roof-panel system.

5. The entire system when assembled is referred to as a stressed-panel building envelope having roof-panels (1, 1') enclosing a roof cavity (5, 5') and the bottom interior membranes (4, 4') enclosing between them and roof-panels (1,1') a chiller cavity (6, 6').

Figure 6A:
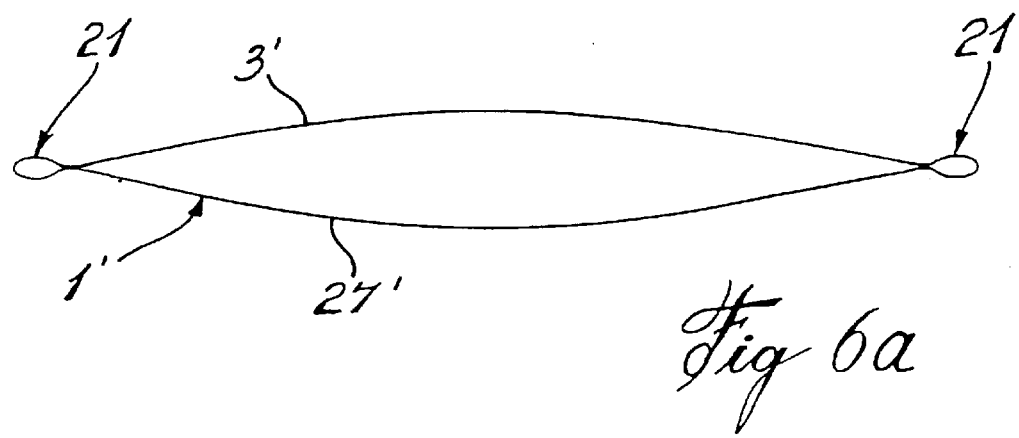
FIG. 6a is a cross-sectional view of a lens-shaped tubular panel with lateral sleeve connectors.
Figure 6B:
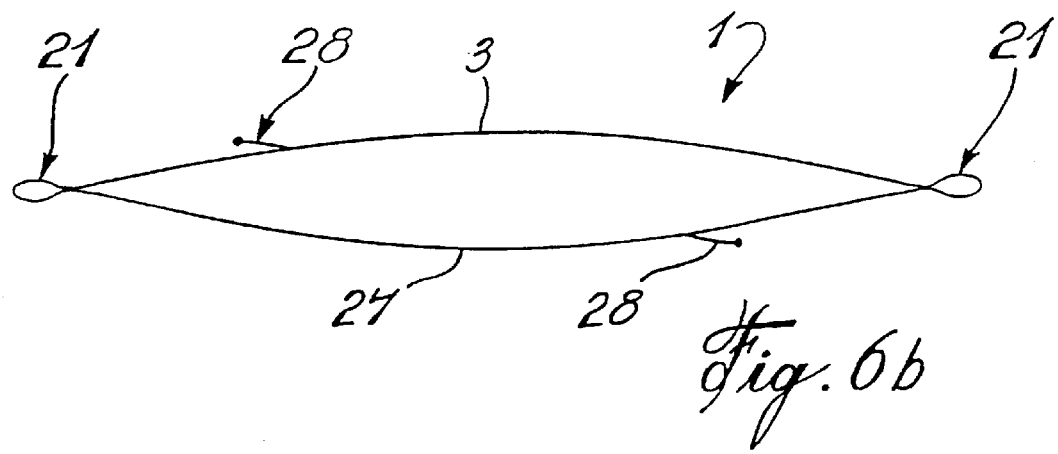
FIG. 6b is a cross-sectional view of a lens-shaped tubular panel with lateral sleeve connectors and additional flange component for allowing the panel to be opened into a parallelogram duct-like shape.
Figure 6C:
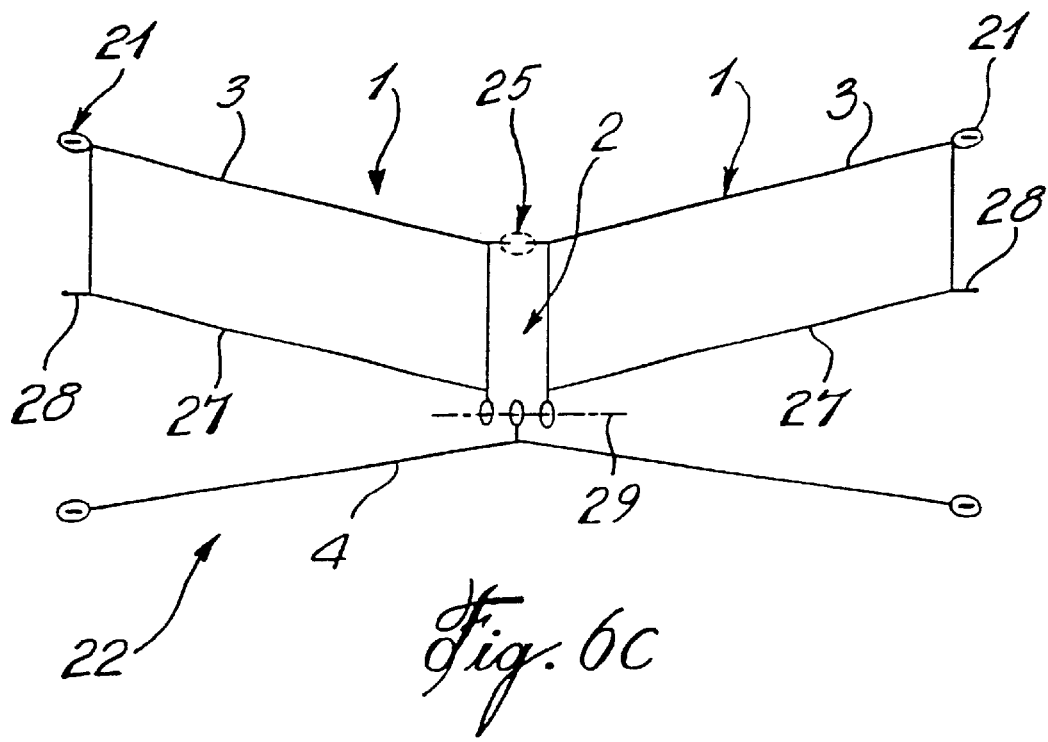
FIG. 6c is a cross-sectional exploded view of a stressed paneling module.

The method of the present invention allows for pre-fabrication of transparent solar panels that are linear, lightweight, double or triple layer, and modular in design, as shown in FIGS. 6a to 6c.

FIG. 6a shows a cross-section of a Lens roof-panel (1') with a sleeve (21) at the edges of the lay-flat panel. FIG. 6b shows a bow-tie stressed-panel (1) which has two additional flange components 28 welded to each face of the stressed-panel (1). Two flange components 28 and two sleeves (21) permit the panel to be opened into a rectangular duct-like shape when installed to the solar structure 20. FIG. 6c is an exploded view of the bow-tie stressed paneling module (22) showing two roof-panels (1) and one bottom interior membrane (4) which is connected beneath the roof-panels (1) at the gutter (2).

FIG. 6b illustrates that both outside edges of the lay flat Lens roof-panel (1) can be fabricated into a 2 in. width sleeve (21). FIG. 6c shows that a light aluminum flat bar (29) is inserted into the sleeve (21) to provide a hard connection mechanism at the panel edge where the gutter assembly is made. Aluminum extrusion "grabbers" (not shown) can be specially designed to slide onto matching plastic flanges (28) that can be formed, sewn and/or welded to the lay-flat tubular roof-panels (1), as mentioned hereinbefore. This aluminum grabber may then lock or attach to the structural member using a variety of generally known mechanisms. Also, a tie (25) can be used to close together the two roof-panels (1) at the top and/or at the bottom of the gutter (2) assembly. As the tie (25) is tightened the post-tension is created in the stressed-panel system.

The scope of this patent is intended to include variations in sheet material used to form the building envelope. Opaque material may be used such as sheet metal and wire mesh. Glass sheet material may be formed with wire mesh and embedded in the glass sheet. The exterior membrane (3, 3') may be formed of such materials and details of attachments can be modified to suit the use of these materials. Light-weight film and membrane materials may be utilized to form the middle and interior layers of the building envelope beneath such a reinforced glass exterior. The wire mesh reinforcement may extend at the edge of the glass sheet material to provide a strong connection to the structural members and to provide a mechanism that will utilize the high tensile strength of the wire mesh. Wire mesh may also couple two glass sheet materials and form a porous gutter (2) connection. It is noted that the gutter (2) may consist of a piece of porous material attached between a pair of adjacent panel (1).

In an other embodiment of the invention, the stressed-panel construction system may be used as an approach to floor construction. For instance, a wire mesh floor construction will be relatively transparent and permit daylight to penetrate to floor levels beneath. A double layer liner-panel beneath the floor structure can form the water cooled ceiling that will control the climate at each level of a multi-floor structure. Opaque floor construction is an alternative wherein the wire mesh is used as a form to support a sheet material on which may be poured a light, thin cement floor slab. Also, sheet metal may substitute for wire mesh and provides not only a form on which to pour the cement but also carries the dead and live loads using the tensile strength of the sheet material.

FIG. 7 illustrates another lightweight building construction in which each stressed paneling module 122 is formed of a multi-layer panel and more specifically in this case of a double-layer panel 101 stretched between successive pairs of bow members 115 and 116 supported by columns 109. Each double-layer panel 101 includes exterior and interior layers 103 and 104 joined together at mid span and spread-apart at opposed ends thereof, thereby defining a pair of chambers or cavity spaces 105. This arrangement ensure that the exterior and interior membranes 103 and 104 will work structurally in opposition to each other, as explained hereinbefore with respect to the embodiment illustrated in FIG. 2. The exterior and interior layers 103 and 104 can be woven together at mid span. The double-layer panel 101 is preferably fabricated from high-technology polymers laminated with light fiberglass scrim or coated on glass fabrics. The double-layer panel 101 can be provided in the form of a loom fabricated double layer woven panel construction which are to be saturation coated by an appropriate coating process. The double-layer panel 101 is preferably porous at the junction of the exterior and interior layers 103 and 104 to provide a rain/snow melt drain.

FIG. 8 illustrates another type of double-layer panel 201 which could be used as a stressed paneling module of a building envelope. The double-layer panel 201 includes and exterior layer 203 and an interior layer 204 which are woven together along a central longitudinal band 207. In its installed position, the distal ends of the layers 203 and 204 are spread-apart as illustrated in dotted lines.

What is claimed is:

1. A modular stressed-panel building envelope, comprising a plurality of multi-layer flexible paneling modules adapted to be stretched between structural members, each of said multi-layer paneling modules having at least exterior and interior stressed layers defining a free space therebetween, said exterior and interior layers being spread apart at their ends while being operatively connected together at a location intermediate said ends so as to induce opposing concave deflections to said exterior and interior layers, thereby providing for said layers to work structurally in opposition to each other.

2. A modular stressed-panel building envelope as defined in claim 1, wherein said interior layer is tied to said exterior layer at mid-span, and wherein said exterior layer has a V-shaped configuration, whereas said interior layer has an inverted V-shaped configuration.

3. A modular stressed-panel building envelope as defined in claim 2, wherein said interior and exterior layers of each of said multi-layer paneling modules are woven together at mid-span.

4. A modular stressed-panel building envelope as defined in claim 3, wherein said multi-layer paneling modules include roof panels, and wherein said roof panels are provided with respective porous portion at a junction of said interior and exterior layers.

5. A modular stressed-panel building envelope as defined in claim 3, wherein each said multi-layer paneling module is provided in the form of a double-layer woven panel having an impermeable coating.

6. A modular stressed-panel building envelope as defined in claim 1, wherein each said multi-layer flexible paneling module includes a pair of side by side connected tubular panels having opposed top and bottom sides, said top sides forming said exterior layer of said multi-layer flexible paneling module.

7. A modular stressed-panel building envelope as defined in claim 6, wherein said interior layer of each said multi-layer paneling module is formed by an inner panel which is connected to said side by side connected tubular panels at a junction thereof so as to exert a pulling action thereon once stressed in position.

8. A modular stressed-panel building envelope as defined in claim 7, wherein said side by side connected tubular panels have a lens shape.

9. A lightweight building construction system, comprising multiple similar stressed roof and wall paneling modules assembled together to form a modular building envelope, wherein each roof paneling module includes at least interior and exterior flexible layers stretched between spaced-apart structural elements, said interior and exterior flexible layers being joined together between said structural elements to work in tandem once in a stressed state, wherein said exterior layer is stressed in a V-shaped configuration, whereas said interior layer is stressed in an inverted V-shaped configuration.

10. A lightweight building construction system as defined in claim 9, wherein said exterior an interior layers are joined together between opposed ends thereof and spread-apart thereat, and wherein said interior and exterior layers are physically connected together at their vertex.

11. A lightweight building construction system as defined in claim 10, wherein said interior layer is tied to said exterior layer at mid-span.

12. A lightweight building construction system as defined in claim 11, wherein said interior and exterior layers of each of said roof paneling modules are woven together at mid-span.

13. A lightweight building construction system as defined in claim 12, wherein said roof paneling modules are provided with respective porous portion at a junction of said interior and exterior layers.

14. A lightweight building construction system as defined in claim 12, wherein each said roof paneling module is provided in the form of a double-layer woven panel having an impermeable coating.

15. A lightweight building construction system as defined in claim 9, wherein each said roof paneling module includes a pair of side by side connected tubular panels having opposed top and bottom sides, said top sides forming said exterior layer of said roof paneling module.

16. A lightweight building construction system as defined in claim 15, wherein said interior layer of each said roof paneling module is formed by an inner panel which is connected to said side by side connected tubular panels at a junction thereof so as to exert a pulling action thereon once stressed in position.

17. A lightweight building construction system as defined in claim 16, wherein said side by side connected tubular panels have a lens shape.

18. A lightweight building construction system as defined in claim 9, further including a gutter hanging from each roof paneling module at a connection of said exterior and interior layers thereof.

19. A lightweight building construction system as defined in claim 18, wherein each said exterior layers is stretched in an open top V-shaped configuration, and wherein each said gutter is located at an apex of said exterior layer.

20. A lightweight building construction system as defined in claim 9, wherein said structural members include a number of flexible joists, each said flexible joist having a first elongated flexible member adapted to be tensely supported in an elevated position, a second elongated flexible member adapted to be supported in tension beneath said first elongated flexible member, and tensor means extending between said first and second elongated flexible members to induce opposing concave deflections in said first and second elongated flexible members, while preventing said first and second elongated flexible members from returning to respective relaxed positions thereof.

21. A lightweight building construction system as defined in claim 20, wherein said tensor means includes a tension member extending between said first and second elongated flexible members.

22. A canopy system for a building structure, comprising a double-layer fabric covering including exterior and interior sheets respectively stretched in a V-shaped configuration and an inverted V-shaped configuration between spaced-apart structural elements, and a gutter supported by said double-layer fabric covering for draining off water therefrom, while allowing said gutter to move jointly with said sheets, said interior and exterior sheets extending in opposite directions from said gutter.

* * * * *